United States Patent
Yabe

(10) Patent No.: US 10,836,884 B2
(45) Date of Patent: Nov. 17, 2020

(54) RUBBER COMPOSITION AND TIRE OBTAINED THEREFROM

(71) Applicant: BRIDGESTONE CORPORATION, Tokyo (JP)

(72) Inventor: Yudai Yabe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 177 days.

(21) Appl. No.: 15/767,464

(22) PCT Filed: Oct. 21, 2016

(86) PCT No.: PCT/JP2016/081361
§ 371 (c)(1),
(2) Date: Apr. 11, 2018

(87) PCT Pub. No.: WO2017/069273
PCT Pub. Date: Apr. 27, 2017

(65) Prior Publication Data
US 2018/0298163 A1    Oct. 18, 2018

(30) Foreign Application Priority Data
Oct. 22, 2015  (JP) ................. 2015-208197

(51) Int. Cl.
| | |
|---|---|
| *C08L 7/00* | (2006.01) |
| *C08K 7/00* | (2006.01) |
| *C08K 7/02* | (2006.01) |
| *C08K 5/42* | (2006.01) |
| *C08L 71/02* | (2006.01) |
| *C08L 101/00* | (2006.01) |
| *B60C 1/00* | (2006.01) |
| *C08K 5/20* | (2006.01) |
| *B29B 7/90* | (2006.01) |
| *B29B 7/28* | (2006.01) |
| *C08K 5/103* | (2006.01) |
| *C08K 9/04* | (2006.01) |

(52) U.S. Cl.
CPC .............. *C08L 7/00* (2013.01); *B29B 7/28* (2013.01); *B29B 7/90* (2013.01); *B60C 1/00* (2013.01); *B60C 1/0016* (2013.01); *C08K 5/103* (2013.01); *C08K 5/20* (2013.01); *C08K 5/42* (2013.01); *C08K 7/02* (2013.01); *C08K 9/04* (2013.01); *C08L 71/02* (2013.01); *C08L 101/00* (2013.01); *C08K 2201/013* (2013.01)

(58) Field of Classification Search
CPC ..................... C08K 9/04; C08K 7/02
See application file for complete search history.

(56) References Cited

U.S. PATENT DOCUMENTS

| | | |
|---|---|---|
| 2002/0148545 A1 | 10/2002 | Nanni et al. |
| 2005/0085582 A1 | 4/2005 | Galimberti et al. |
| 2015/0369335 A1 | 12/2015 | Ishiguro et al. |
| 2017/0158846 A1* | 6/2017 | Tanabe ................ B60C 1/00 |

FOREIGN PATENT DOCUMENTS

| | | |
|---|---|---|
| CN | 1615336 A | 5/2005 |
| EA | 201071070 A1 | 4/2011 |
| EA | 201290932 A1 | 2/2013 |
| EP | 0 940 435 A1 | 9/1999 |
| EP | 2 799 481 A1 | 11/2014 |
| JP | 9-249771 A | 9/1997 |
| JP | 2000-191829 A | 7/2000 |
| JP | 2001-254223 A | 9/2001 |
| JP | 2002-275311 A | 9/2002 |
| JP | 2006-83264 A | 3/2006 |
| JP | 2009-144032 A | 7/2009 |
| JP | 2012-219242 A | 11/2012 |
| JP | 2012-219246 A | 11/2012 |
| JP | 2013-56992 A | 3/2013 |
| JP | 2014-210829 A | 11/2014 |
| JP | 2014-227487 A | 12/2014 |
| RU | 2002103335 A | 10/2003 |
| WO | 03037655 A1 | 5/2003 |
| WO | 03/060002 A1 | 7/2003 |
| WO | 2014/119671 A1 | 8/2014 |

OTHER PUBLICATIONS

Machine translation of JP 2006-083264 A, published Mar. 30, 2006. (Year: 2006).*
Communication dated Mar. 4, 2019 from the Russian Patent Office in application No. 2018118542.
International Search Report for PCT/JP2016/081361 dated Dec. 20, 2016 [PCT/ISA/210].
Extended European Search Report dated Oct. 10, 2018 issued by the European Patent Office in counterpart application No. 16857586.8.
Search Report dated Aug. 29, 2019, from the State Intellectual Property Office of People's Republic of China in counterpart Application No. 201680061034.9.

* cited by examiner

*Primary Examiner* — Vickey Nerangis
(74) *Attorney, Agent, or Firm* — Sughrue Mion, PLLC

(57) ABSTRACT

Provided are a rubber composition excellent in fracture resistance, wear resistance, and on-ice performance, and a tire obtained therefrom. There are provided a rubber composition containing: a diene-based rubber component; a short fiber; and a surface active agent, in which the surface active agent contains at least one material selected from the group consisting of a fatty acid polyhydric alcohol ester, a nonionic ester type surface active agent, an alkanolamide type surface active agent, and a sulfonic acid type surface active agent, and a tire obtained from the rubber composition, more particularly a studless tire.

14 Claims, No Drawings

RUBBER COMPOSITION AND TIRE OBTAINED THEREFROM

CROSS REFERENCE TO RELATED APPLICATIONS

This application is a National Stage of International Application No. PCT/JP2016/081361, filed on Oct. 21, 2016, which claims priority from Japanese Patent Application No. 2015-208197, filed on Oct. 22, 2015.

TECHNICAL FIELD

The present invention relates to a rubber composition and a tire obtained therefrom, more in detail to a rubber composition excellent in fracture resistance, wear resistance, and on-ice performance, and a tire obtained therefrom, and more particularly to a studless tire.

BACKGROUND ART

Conventionally, in view of improving the safety of a vehicle, various studies have been conducted to improve braking performance and driving performance of a tire on various road surfaces including not only a dry road surface but also a wet road surface, an ice/snow road surface, and the like.

For example, in order to improve on-ice performance, low fuel consumption performance, wear resistance, and heat aging resistance of a tire in a balanced manner, in Patent Document 1, there is proposed a rubber composition for a studless tire which contains: a modified natural rubber that is highly purified and has a pH adjusted to 2 to 7; and a carbon black and/or a white filler.

RELATED ART DOCUMENT

Patent Document

Patent Document 1: Japanese Unexamined Patent Application Publication No. 2014-227487

SUMMARY OF THE INVENTION

Problems to be Solved by the Invention

In studless tires obtained from the rubber composition for a studless tire as disclosed in Patent Document 1 and further from various rubber compositions which have been proposed so far, an improvement of on-ice performance together with various performances of a tire has been made. However, a further improvement of such performances has been desired still nowadays.

Thus, it is an object of the present invention to provide a rubber composition excellent in fracture resistance, wear resistance, and on-ice performance and a tire obtained therefrom, more particularly a studless tire.

Means for Solving the Problems

In order to solve the above problems, the present inventors intensively studied so as to find out that a specific surface active agent is used together with a short fiber, whereby the above problems can be solved, and the present invention has been accomplished.

In other words, a rubber composition of the present invention is a rubber composition containing: a diene-based rubber component: a short fiber; and a surface active agent, in which the surface active agent contains at least one material selected from the group consisting of a fatty acid polyhydric alcohol ester, a nonionic ester type surface active agent, an alkanolamide type surface active agent, and a sulfonic acid type surface active agent.

The rubber composition of the present invention can be suitably compounded with a foaming agent. Moreover, preferably, the short fiber and the surface active agent are blended in advance with each other to form a composite, and the composite is compounded. Further, preferably, the surface active agent contains a fatty acid polyhydric alcohol ester, a nonionic ester type surface active agent, an alkanolamide type surface active agent, and a sulfonic acid type surface active agent. Still further, preferably, in relation to 100 parts by mass of the surface active agent, 40 to 70 parts by mass of a nonionic ester type surface active agent is contained.

A tire of the present invention is characterized by being obtained from the rubber composition.

The tire of the present invention is preferably a studless tire.

Effects of the Invention

According to the present invention, there can be provided a rubber composition excellent in fracture resistance, wear resistance, and on-ice performance and a tire obtained therefrom, more particularly a studless tire.

MODE FOR CARRYING OUT THE INVENTION

Hereinafter, embodiments of the present invention will be specifically described.

A rubber composition of the present invention is a rubber composition containing: a diene-based rubber component: a short fiber; and a surface active agent, in which the surface active agent contains at least one material selected from the group consisting of a fatty acid polyhydric alcohol ester, a nonionic ester type surface active agent, an alkanolamide type surface active agent, and a sulfonic acid type surface active agent.

The diene-based rubber component which can be used for the rubber composition of the present invention is not particularly limited, and a natural rubber (NR) as well as a synthetic rubber, such as a polyisoprene rubber (IR), a styrene-butadiene copolymer rubber (SBR), a polybutadiene rubber (BR), an ethylene-propylene-diene rubber (EPDM), a chloroprene rubber (CR), a halogenated butyl rubber, and an acrylonitrile-butadiene rubber (NBR) can be used, and especially, the natural rubber (NR), the styrene-butadiene copolymer rubber (SBR), and the butadiene rubber (BR) are preferable. Such rubber components may be used alone or in combination of two or more thereof.

The rubber composition of the present invention contains, together with the diene-based rubber component as described above, the short fiber and the specific surface active agent, thereby being excellent in fracture resistance, wear resistance, and on-ice performance, and a tire obtained from such a rubber composition is particularly preferably a studless tire.

A material of the short fiber is not to be particularly limited, and a short fiber made of a normal synthetic resin can be suitably employed. When the rubber composition compounded with such a short fiber is used for a tread, a drainage groove is formed due to this short fiber as the tread wears after the vulcanization, and on-ice performance is improved. Preferably, the rubber composition is compounded with a foaming agent, whereby bubbles having a long shape are formed along this short fiber, and a further improvement of a drainage performance can be made. Further, as a resin which composes the short fiber, a hydrophilic resin is employed, thereby utilizing the affinity with the water to be also capable of exhibiting a further favorable drainage performance.

As the resin which composes the short fiber, a polyethylene, a polypropylene, an ethylene-vinyl alcohol copolymer, a vinyl alcohol homopolymer, a poly (meth) acrylic acid or an ester thereof, a polyethylene glycol, a carboxy vinyl copolymer, a styrene-maleic acid copolymer, a polyvinyl pyrrolidone, a vinyl pyrrolidone-vinyl acetate copolymer, a mercaptoethanol, and the like can be cited. Especially, an ethylene-vinyl alcohol copolymer, a vinyl alcohol homopolymer, and a poly (meth) acrylic acid are preferable, and an ethylene-vinyl alcohol copolymer is particularly preferable.

An average length of the short fiber used in the present invention is preferably 0.1 to 500 mm, more preferably 0.1 to 7 mm. Moreover, an average diameter is preferably 0.001 to 2 mm, more preferably 0.005 to 0.5 mm. When the average length and the average diameter fall within the above preferable ranges, there is no risk that the fibers are entangled with each other more than necessary and a favorable dispersion performance is inhibited. Further, an aspect ratio is preferably 10 to 4,000, more preferably 50 to 2,000.

Moreover, an amount of the short fiber compounded in relation to 100 parts by mass of the rubber component is preferably 0.1 to 100 parts by mass, more preferably 0.1 to 50 parts by mass. The amount of the short fiber is adapted to fall within the above preferable range, thereby being capable of providing effectively both a favorable drainage performance and an excellent dispersion performance in the rubber component.

The surface active agent which can be used in the present invention contains at least one material selected from the group consisting of a fatty acid polyhydric alcohol ester, a nonionic ester type surface active agent, an alkanolamide type surface active agent, and a sulfonic acid type surface active agent. Together with the short fiber, such a surface active agent is blended, whereby a dispersion performance of the short fiber is improved and an improvement of fracture resistance, wear resistance, and on-ice performance can be made. Preferably, the fatty acid polyhydric alcohol ester, the nonionic ester type surface active agent, the alkanolamide type surface active agent, and the sulfonic acid type surface active agent are contained. Further, in relation to 100 parts by mass of the surface active agent, 40 to 70 parts by mass of the nonionic ester type surface active agent is contained.

As the fatty acid polyhydric alcohol ester, glycerol monolaurate, glycerol monooleate, glycerol monostearate, glycerol dilaurate, glycerol dioleate, glycerol distearate, glycerol trilaurate, glycerol trioleate, glycerol tristearate, sorbitan monolaurate, sorbitan monooleate, sorbitan monostearate, sorbitan dilaurate, sorbitan dioleate, sorbitan distearate, sorbitan trilaurate, sorbitan trioleate, sorbitan stearate, a castor oil, a hardened castor oil, and the like can be cited.

As the nonionic ester type surface active agent, polyoxyalkylene glycerol monolaurate, polyoxyalkylene glycerol monooleate, polyoxyalkylene glycerol monostearate, polyoxyalkylene glycerol dilaurate, polyoxyalkylene glycerol dioleate, polyoxyalkylene glycerol distearate, polyoxyalkylene glycerol trilaurate, polyoxyalkylene glycerol trioleate, polyoxyalkylene glycerol tristearate, polyoxyalkylene sorbitan monolaurate, polyoxyalkylene sorbitan monooleate, polyoxyalkylene sorbitan monostearate, polyoxyalkylene sorbitan dilaurate, polyoxyalkylene sorbitan dioleate, polyoxyalkylene sorbitan distearate, polyoxyalkylene sorbitan trilaurate, polyoxyalkylene sorbitan trioleate, polyoxyalkylene sorbitan tristearate, polyoxyalkylene castor oil monolaurate, polyoxyalkylene castor oil monooleate, polyoxyalkylene castor oil monostearate, polyoxyalkylene castor oil dilaurate, polyoxyalkylene castor oil dioleate, polyoxyalkylene castor oil distearate, polyoxyalkylene castor oil trilaurate, polyoxyalkylene castor oil trioleate, polyoxyalkylene castor oil tristearate, polyoxyalkylene hardened castor oil monolaurate, polyoxyalkylene hardened castor oil monooleate, polyoxyalkylene hardened castor oil monostearate, polyoxyalkylene hardened castor oil dilaurate, polyoxyalkylene hardened castor oil dioleate, polyoxyalkylene hardened castor oil distearate, polyoxyalkylene hardened castor oil trilaurate, polyoxyalkylene hardened castor oil trioleate, polyoxyalkylene hardened castor oil tristearate, and the like can be cited.

As the alkanolamide type surface active agent, lauric acid diethanolamide, coconut fatty acid diethanolamide, myristic acid diethanolamide, palmitic acid diethanolamide, stearic acid diethanolamide, oleic acid diethanolamide, polyoxyethylene octyl amide, polyoxyethylene lauryl amide, polyoxyethylene stearyl amide, polyoxyethylene oleyl amide, and the like can be cited.

As the sulfonic acid type surface active agent, an alkyl sulfonate, such as sodium octyl sulfonate, sodium decyl sulfonate, sodium dodecyl sulfonate, lithium tetradecyl sulfonate, and potassium hexadecyl sulfonate; an alkyl benzene sulfonate having an alkyl group, such as potassium octyl benzene sulfonate and sodium dodecyl benzene sulfonate; a 1,2-bis(dialkyl oxycarbonyl)-ethanesulfonate having an alkyl group, such as sodium 1,2-bis(dibutyl oxycarbonyl)-ethanesulfonate, potassium 1,2-bis(dipentyl oxycarbonyl)-ethanesulfonate, lithium 1,2-bis(dihexyl oxycarbonyl)-ethanesulfonate, sodium 1,2-bis(diheptyl oxycarbonyl)-ethanesulfonate, sodium 1,2-bis(dioctyl oxycarbonyl)-ethanesulfonate, lithium 1,2-bis(dinonyl oxycarbonyl)-ethanesulfonate, sodium 1,2-bis(didecyl oxycarbonyl)-ethanesulfonate, sodium 1,2-bis(diundecyl oxycarbonyl)-ethanesulfonate, sodium 1,2-bis(didodecyl oxycarbonyl)-ethanesulfonate, and the like can be cited.

Moreover, a surface active agent amount in 100 parts by mass of the rubber component is preferably 0.0003 to 15.0 parts by mass, more preferably 0.003 to 10.0 parts by mass. Further, a surface active agent adhesion amount onto a fiber surface is, in relation to 100 parts by mass of the fiber, preferably 0.03 parts by mass to 15.0 parts by mass, more preferably 0.3 parts by mass to 10.0 parts by mass. The surface active agent which falls within the above preferable range is used, whereby an excellent dispersion performance of the short fiber can be obtained without having a bad influence on various physical properties.

In the rubber composition of the present invention, preferably, the surface active agent is applied onto a surface of the short fiber in advance so as to be a composite which is then compounded with the diene-based rubber component. Thereby, dispersion performance of the short fiber can be further improved.

An adhesion percentage of the surface active agent in the composite is preferably 0.3 to 0.6% by mass.

The rubber composition of the present invention is preferably compounded with a foaming agent, and compounding a foaming agent allows a gas generated from the foaming agent during a vulcanization process to disperse in the rubber and allows such a gas to form bubbles having a shape in accordance with a shape of the short fiber as molten. Such bubbles are present in the rubber, thereby being capable of allowing a function as a drainage groove to be exhibited as the tire wears and allowing the tire to be provided with a further excellent drainage performance.

As the above foaming agent, specifically, for example, azodicarbonamide (ADCA), dinitrosopentamethylenetetramine (DPT), dinitrosopentastyrenetetramine, benzene sulfonyl hydrazide derivatives, p, p'-oxybis benzene sulfonyl hydrazide (OBSH), ammonium bicarbonate, sodium bicarbonate, and ammonium carbonate which generate carbon dioxide, nitroso sulfonyl azo compound, N,N'-dimethyl-N,N'-dinitroso phthalamide, toluenesulfonyl hydrazide, p-toluenesulfonyl semicarbazide, p,p'-is oxybisbenzenesulfonyl semicarbazide which generate nitrogen, and the like can be cited. Especially, in view of processability, azodicarbonamide (ADCA), dinitrosopentamethylenetetramine (DPT) are preferable. Such foaming agents may be used alone or in combination of two or more thereof. Moreover, an amount of the foaming agent compounded is not particularly limited, but preferably falls within a range of 0.1 to 10 parts by mass in relation to 100 parts by mass of the rubber component. Note that the above foaming agent may be contained in the short fiber.

Moreover, the above foaming agent is desirably used in combination with a foaming assistant such as urea, zinc stearate, benzenesulfinic acid zinc, zinc white, and the like. These may be used alone or in combination of two or more thereof. The foaming aid is used together, thereby being capable of promoting a foaming reaction to enhance a completeness of the reaction and inhibiting an unnecessary deterioration over time.

Note that in a vulcanized rubber obtained after the vulcanization of the rubber composition containing the above foaming agent, a foaming ratio thereof is normally 1 to 50%, preferably 5 to 40%. When the foaming agent is compounded, if the foaming ratio is too large, a gap at a rubber surface becomes also large so that there is a risk that a sufficient ground contact is no longer ensured, whereas if the foaming ratio falls within the above range, an amount of bubbles can be suitably maintained while formation of bubbles which effectively function as a drainage groove is ensured so that there is also no risk that a durability is deteriorated. Herein, the foaming ratio of the vulcanized rubber as described above means an average foaming ratio Vs and specifically means a value calculated by Equation (I) below:

$$Vs=(\rho_0/\rho_1-1)\times 100(\%) \quad (I),$$

where $\rho_1$ denotes the density (g/cm$^3$) of the vulcanized rubber (foamed rubber), and $\rho_0$, denotes the density (g/cm$^3$) of the solid phase part in the vulcanized rubber (foamed rubber).

In the rubber composition of the present invention, the diene-based rubber component may be compounded with, together with the short fiber and the specific surface active agent, as well as the foaming agent and the foaming assistant as described above, as necessary, a compounding agent which is commonly used in the rubber industry, such as a filler, for example, a carbon black, a softening agent, stearic acid, an antiaging agent, zinc white, a vulcanization accelerator, and a vulcanizing agent may be suitably compounded within such an extent as not to impair the object of the present invention.

According to an aspect of a manufacturing method of the rubber composition of the present invention, the diene-based rubber component, the short fiber, and the surface active agent are blended with each other at a time. Then, according to a common procedure, a step, such as kneading, is performed.

According to another aspect of the manufacturing method of the rubber composition of the present invention, the surface active agent is applied onto a surface of the short fiber in advance so as to be a composite which is then compounded with the diene-based rubber component. Thereby, without depending on a subsequent step, such as kneading, formation of a surface active agent layer on a short fiber surface can be further ensured.

As the tire of the present invention, the above rubber composition or the above vulcanized rubber after a vulcanization step is used. In accordance with a type and a member of the tire to be applied, the rubber composition as unvulcanized may be used and vulcanized after molding so as to be obtained, or a semi-vulcanized rubber after a pre-vulcanization step and the like may be used and molded, and then be further fully vulcanized so as to be obtained. Among various members of the tire, in view of being capable of sufficiently exhibiting favorable drainage performance, excellent fracture resistance and excellent wear resistance, application is preferably made to a tread member and preferably to a studless tire. Note that as a gas to be filled in the tire, an inert gas, such as nitrogen, argon or helium as well as the ordinary air or air with an oxygen partial pressure as adjusted, can be used.

The invention claimed is:

1. A rubber composition comprising: a diene-based rubber component; a short fiber; and a surface active agent, wherein the surface active agent contains a fatty acid polyhydric alcohol ester, a nonionic ester surface active agent, an alkanolamide surface active agent, and a sulfonic acid surface active agent.

2. The rubber composition according to claim 1, further comprising a foaming agent.

3. The rubber composition according to claim 2, wherein the short fiber and the surface active agent are blended in advance with each other to form a composite, and the composite is compounded.

4. The rubber composition according to claim 3, wherein in relation to 100 parts by mass of the surface active agent, 40 to 70 parts by mass of a nonionic ester surface active agent is contained.

5. The rubber composition according to claim 2, wherein in relation to 100 parts by mass of the surface active agent, 40 to 70 parts by mass of a nonionic ester surface active agent is contained.

6. The rubber composition according to claim 1, wherein the short fiber and the surface active agent are blended in advance with each other to form a composite, and the composite is compounded.

7. The rubber composition according to claim 6, wherein in relation to 100 parts by mass of the surface active agent, 40 to 70 parts by mass of a nonionic ester surface active agent is contained.

8. The rubber composition according to claim 1, wherein in relation to 100 parts by mass of the surface active agent, 40 to 70 parts by mass of a nonionic ester surface active agent is contained.

9. A tire using the rubber composition according to claim 1.

10. The tire according to claim 9 being a studless tire.

11. A tire using the rubber composition according to claim 2.

12. A tire using the rubber composition according to claim 6.

13. A tire using the rubber composition according to claim 8.

14. A tire using the rubber composition according to claim 3.

* * * * *